(12) United States Patent
Choi et al.

(10) Patent No.: US 9,318,830 B2
(45) Date of Patent: Apr. 19, 2016

(54) SIM CARD SOCKET AND TERMINAL DEVICE INCLUDING THE SAME

(71) Applicant: Samsung Electronics Co., Ltd., Gyeonggi-do (KR)

(72) Inventors: Jongchul Choi, Gyeonggi-do (KR); Myunggeun Koh, Gyeonggi-do (KR); Jaebong Chun, Gyeonggi-do (KR); Hyoungwook Yi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 84 days.

(21) Appl. No.: 14/152,559

(22) Filed: Jan. 10, 2014

(65) Prior Publication Data

US 2014/0199875 A1    Jul. 17, 2014

(30) Foreign Application Priority Data

Jan. 17, 2013   (KR) .................. 10-2013-0005224

(51) Int. Cl.
| | |
|---|---|
| *H01R 13/193* | (2006.01) |
| *H01R 13/639* | (2006.01) |
| *H04B 1/38* | (2015.01) |
| *H04M 1/02* | (2006.01) |
| *G06K 7/00* | (2006.01) |
| *G06K 13/08* | (2006.01) |
| *H04B 1/3816* | (2015.01) |

(52) U.S. Cl.
CPC ............ *H01R 13/193* (2013.01); *G06K 7/0052* (2013.01); *G06K 13/085* (2013.01); *H01R 13/639* (2013.01); *H04B 1/3816* (2013.01); *H04M 1/026* (2013.01)

(58) Field of Classification Search
CPC .... H01R 13/193; H01R 13/639; H01R 27/00; H01R 12/721; G06K 13/085; G06K 7/0052
USPC ......... 439/152, 160, 345, 630, 946, 159, 331; 370/329
See application file for complete search history.

(56) References Cited

U.S. PATENT DOCUMENTS

| | | | | |
|---|---|---|---|---|
| 6,062,887 | A * | 5/2000 | Schuster et al. | 439/218 |
| 6,863,571 | B2 * | 3/2005 | Sato et al. | 439/630 |
| 2004/0110423 | A1 | 6/2004 | Shishikura et al. | |
| 2008/0305665 | A1 * | 12/2008 | Hong et al. | 439/153 |
| 2014/0099805 | A1 * | 4/2014 | Kutchery et al. | 439/76.1 |

FOREIGN PATENT DOCUMENTS

| | | |
|---|---|---|
| KR | 200286364 | 8/2002 |
| KR | 1020050055412 | 6/2005 |
| KR | 200413786 | 4/2006 |

* cited by examiner

*Primary Examiner* — Amy Cohen Johnson
*Assistant Examiner* — Oscar C Jimenez
(74) *Attorney, Agent, or Firm* — The Farrell Law Firm, P.C.

(57) ABSTRACT

A SIM card socket is provided, includes a first contact part having first contact terminals electrically contacting a first SIM card when the first SIM card is received; a second contact part having second contact terminals electrically contacting a second SIM card when the second SIM card is received, wherein the second SIM card has a size different from that of the first SIM card; a first stopper disposed on the second contact part and being movable by a predetermined distance in a lengthwise direction of the second contact part along a surface of the second contact part to support insertion of the first SIM card or insertion of the second SIM card; and a cover covering the first contact part, the second contact part, and the first stopper.

15 Claims, 8 Drawing Sheets

EXTERNAL SHAPE OF SOCKET

INTERNAL SHAPE OF SOCKET

SIM CARD SOCKET AND TERMINAL DEVICE INCLUDING THE SAME

PRIORITY

This application claims priority under 35 U.S.C. §119(a) to Korean Patent Application Serial No. 10-2013-0005224 filed on Jan. 17, 2013 in the Korean Intellectual Property Office, the entire disclosure of which is incorporated herein by reference.

BACKGROUND OF THE DISCLOSURE

1. Field of the Disclosure

The present disclosure relates to a SIM card socket. More particularly, the present disclosure relates to a SIM card socket into which SIM cards having different sizes can be inserted and a terminal device including the same.

2. Description of the Related Art

Portable terminals are being used by many users due to their communication functions and sufficiently small sizes which enable users to carry the portable terminals. In recent years, the portable terminal market has dramatically grown as the sizes of touch screens increase and hardware and software that can provide various content supports the portable terminals.

Portable terminals of the related art employ SIM cards to support the confidentiality of terminal users in the process of supporting communication functions. Accordingly, users can optionally use various terminal devices by using SIM cards in which their own information is recorded. Since unique information for service providers is recorded in the SIM cards, users must apply for subscriptions to the service providers to use communication services provided by the service providers and to receive SIM cards issued by the service providers. To use a desired communication service, a user may insert (and later remove) a SIM card into one terminal device. There may also be a need for multiple users to use a single terminal device to use the communication services in which the users are enrolled—thus needing to insert (and later remove) different SIM cards into the single terminal device. However, as sizes and standards of SIM cards have changed recently, there may occur a difficulty in replacement and insertion of SIM cards. Because micro SIM cards are among the first SIM cards to be conventionally used, most sockets supporting the insertion of SIM cards into terminal devices have been designed to correspond to the size of the micro SIM cards. However, due to recent developments in hardware technology, nano SIM cards having a size different from the size of the micro SIM cards have been manufactured and circulated for various uses.

Accordingly, terminal devices also realize sockets into which nano SIM cards may be inserted. As a result, since the micro SIM cards and the nano SIM cards have different sizes, they cannot use sockets of the same size. Although a method of realizing a micro SIM card socket and a nano SIM card socket has been proposed, there is difficulty in securing sufficient mounting space in a terminal device. As a result, only one SIM card can be inserted, since a socket space for another SIM card presents the problem of having to allocate an additional space in the device.

SUMMARY

The present disclosure has been made in view of the above problems and disadvantages, and provides at least the advantages described below. Accordingly, a SIM card socket is provided that enables various SIM cards having different sizes to be replaced by providing a form of the socket such that the SIM cards may be inserted into and removed from the socket, and a portable device including the same.

In accordance with an aspect of the present disclosure, a SIM card socket includes a first contact part having first contact terminals electrically contacting a first SIM card when the first SIM card is received; a second contact part having second contact terminals electrically contacting a second SIM card when the second SIM card is received, wherein the second SIM card has a size different from that of the first SIM card; a first stopper disposed on the second contact part and being movable by a predetermined distance in a lengthwise direction of the second contact part along a surface of the second contact part to support insertion of the first SIM card or insertion of the second SIM card; and a cover covering the first contact part, the second contact part, and the first stopper.

BRIEF DESCRIPTION OF THE DRAWINGS

The above and other aspects, features and advantages of certain embodiments of the present disclosure will be more apparent from the following detailed description in conjunction with the accompanying drawings, in which.

DETAILED DESCRIPTION OF EMBODIMENTS OF THE PRESENT DISCLOSURE

An embodiment of the present disclosure will be described in detail with reference to the accompanying drawings. The technical contents that are well known in the technical field to which the present disclosure pertains but are not directly relevant to the present disclosure will not be described. Further, a detailed description of a configuration of the present disclosure will be omitted when it may obscure the subject matter of the present disclosure.

For the same reason, some constituent elements are exaggerated, omitted or schematically illustrated in the accompanying drawings and the sizes of the constituent elements may not reflect their actual sizes. Thus, the present disclosure is not limited to the relative sizes or distances illustrated in the accompanying drawings.

It is to be understood that the singular forms "a", "an" and "the", include plural references unless the context clearly dictates otherwise. It will be further understood that the terms "has", "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As described herein, the SIM card socket and the terminal device according to the present disclosure enables a desired SIM card to be inserted into the socket irrespective of the size of the SIM card.

Figure 1:
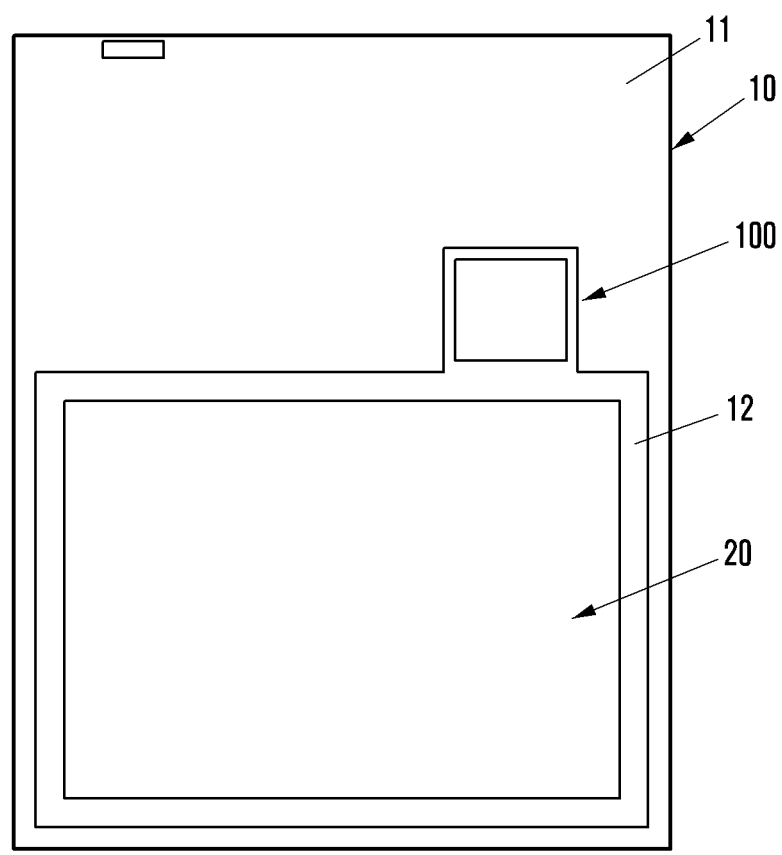
FIG. 1 is a view illustrating an external appearance of a terminal device having a SIM card socket in accordance with an embodiment of the present disclosure.

FIG. 1 is a view illustrating an external appearance of a terminal device having a SIM card socket in accordance with an embodiment of the present disclosure.

Referring to FIG. 1, a terminal device 10, in accordance with the embodiment of the present disclosure, may include a positioning part 12 in which a battery 20 is positioned, and a SIM card socket 100 provided in a peripheral area of the positioning part 12, and may include a case 11 in which the positioning part 12 and the SIM card socket 100 are provided. In addition, the terminal device 10 may further include spaces for a communication module supporting a communication function, an antenna, and a display unit, spaces for other various modules (for example, a camera module, a microphone, a speaker, and a sensor), and spaces for various components. FIG. 1 illustrates a rear surface of the terminal device 10, and a display unit may be disposed on a front surface of the terminal device 10. As illustrated, the positioning part 12 in which the battery 12 is positioned may be disposed on the rear surface of the terminal device 10, and the SIM card socket 100 into which a SIM card may be detachably inserted is disposed at one side of the positioning part 12.

The SIM card socket 100, in accordance with the embodiment of the present disclosure, may be provided in a form in which a first SIM card having a first size and a second SIM card having a second size may be inserted into the SIM card socket 100. Although not illustrated, the SIM card socket 100 may be realized such that various circuit wires are disposed in the SIM card socket 100 to contact the inserted SIM cards so that information stored in the SIM cards may be read or information may be recorded in the SIM cards. Accordingly, the terminal device 10, in accordance with the embodiment of the present disclosure, can recognize the normal insertion of a SIM card having a first size or a SIM card having a second size into the SIM card socket 100, and can support management of the terminal device 10 based on information stored in the SIM card.

Although not illustrated, terminal device 10 may further include a control unit for supporting various signal flows and controls for reading information from the SIM card inserted into the SIM card socket 100 or storing information in the SIM card. The control unit may be provided in the form of a chip on a printed circuit board, and various circuit wires for connection to the SIM card socket 100 may be provided.

While it is illustrated that the SIM card socket 100, in accordance with the embodiment of the present disclosure, is formed at one side of an upper right end of the positioning part 12 into which the battery 20 may be detachably inserted, the present disclosure is not limited to such location. That is, the SIM card socket 100 at which a SIM card may be detachably inserted may be disposed at any of various locations. The terminal 10 may further include a battery cover covering the SIM card socket 100 and the positioning part 12.

Figure 2:
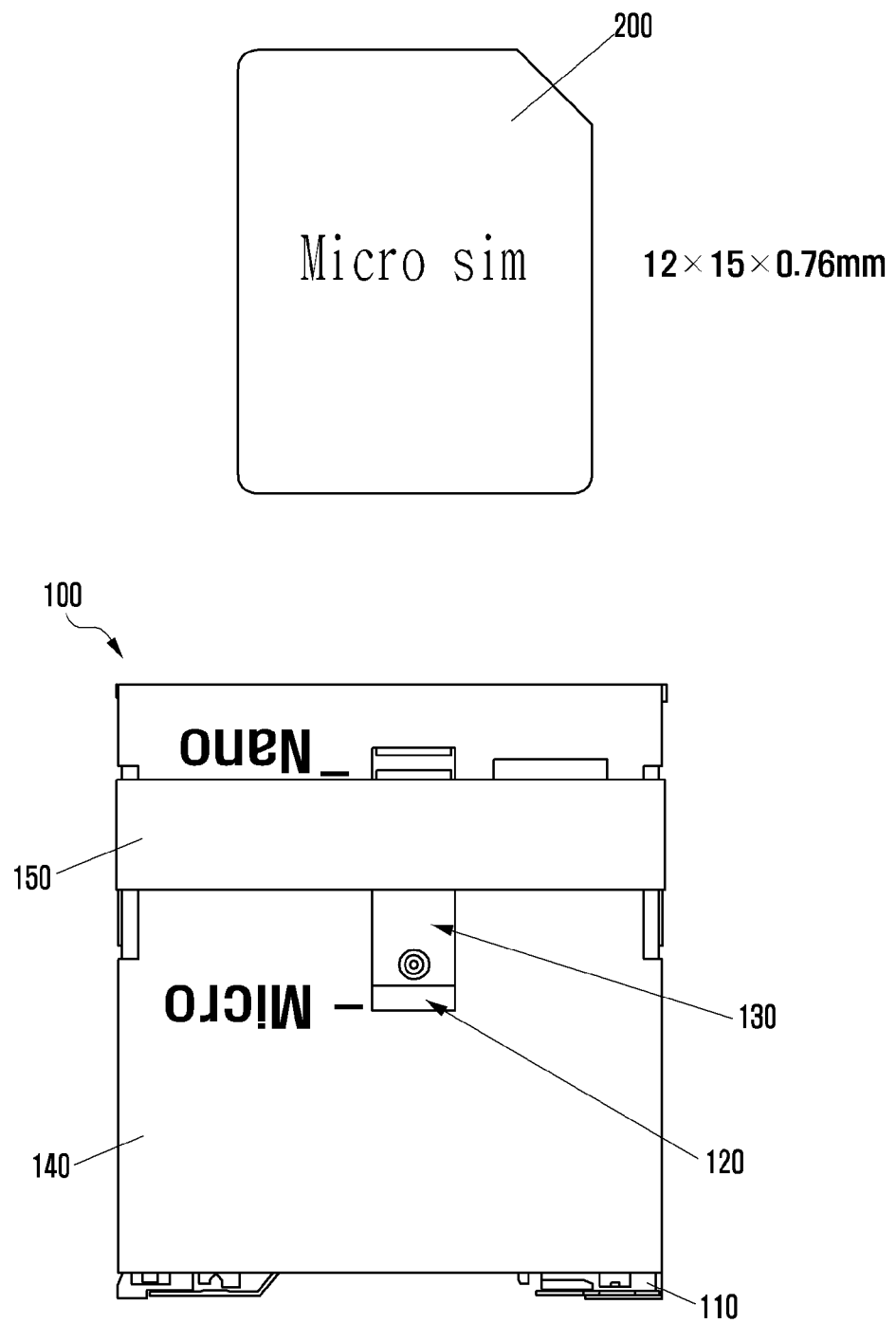
FIG. 2 illustrates a configuration in which a first SIM card is to be inserted into the SIM card socket in accordance with the embodiment of the present disclosure.

FIG. 2 illustrates a configuration in which a first SIM card is to be inserted into the SIM card socket 100 in accordance with the embodiment of the present disclosure.

Figure 3:
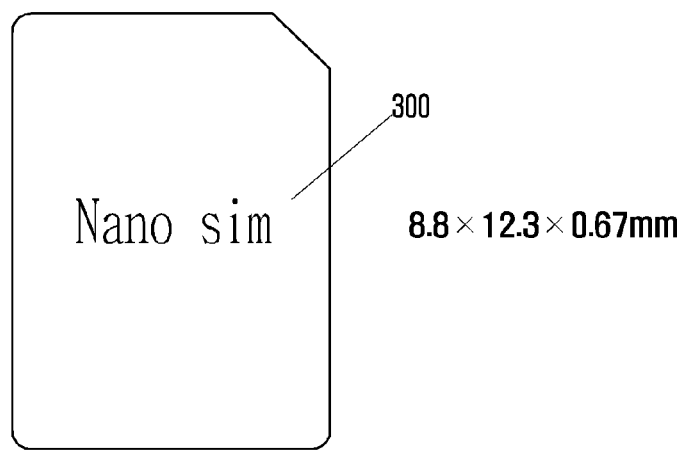
FIG. 3 illustrates a configuration in which a second SIM card is to be inserted into the SIM card socket in accordance with the embodiment of the present disclosure.
Figure 3:
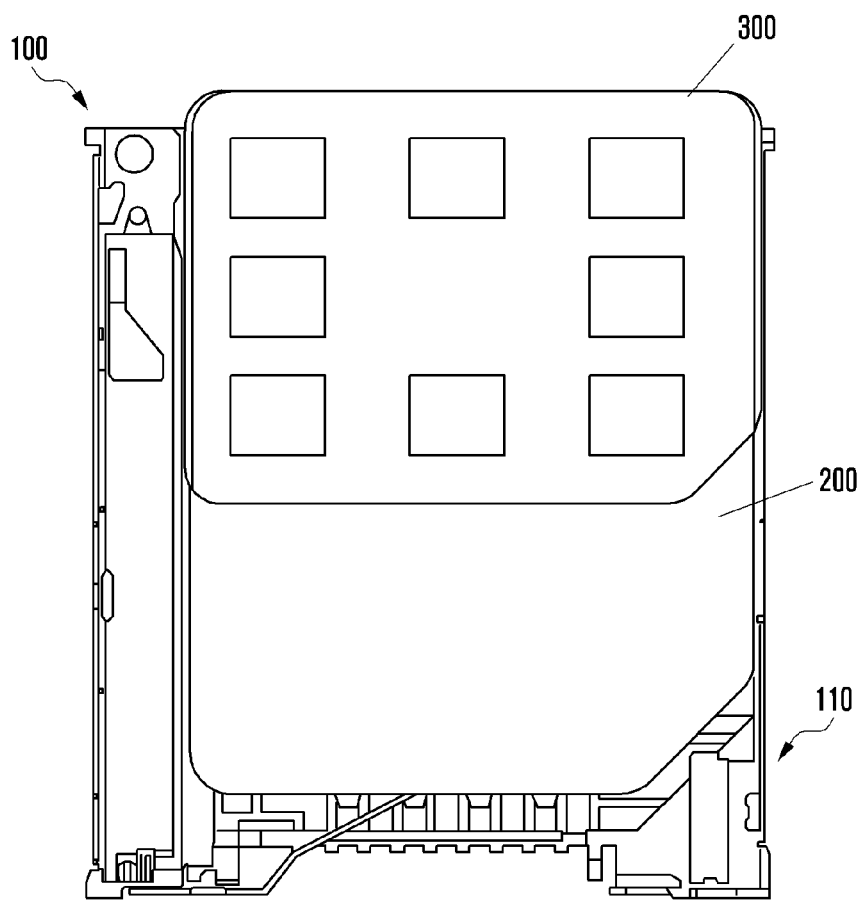
Figure 4:
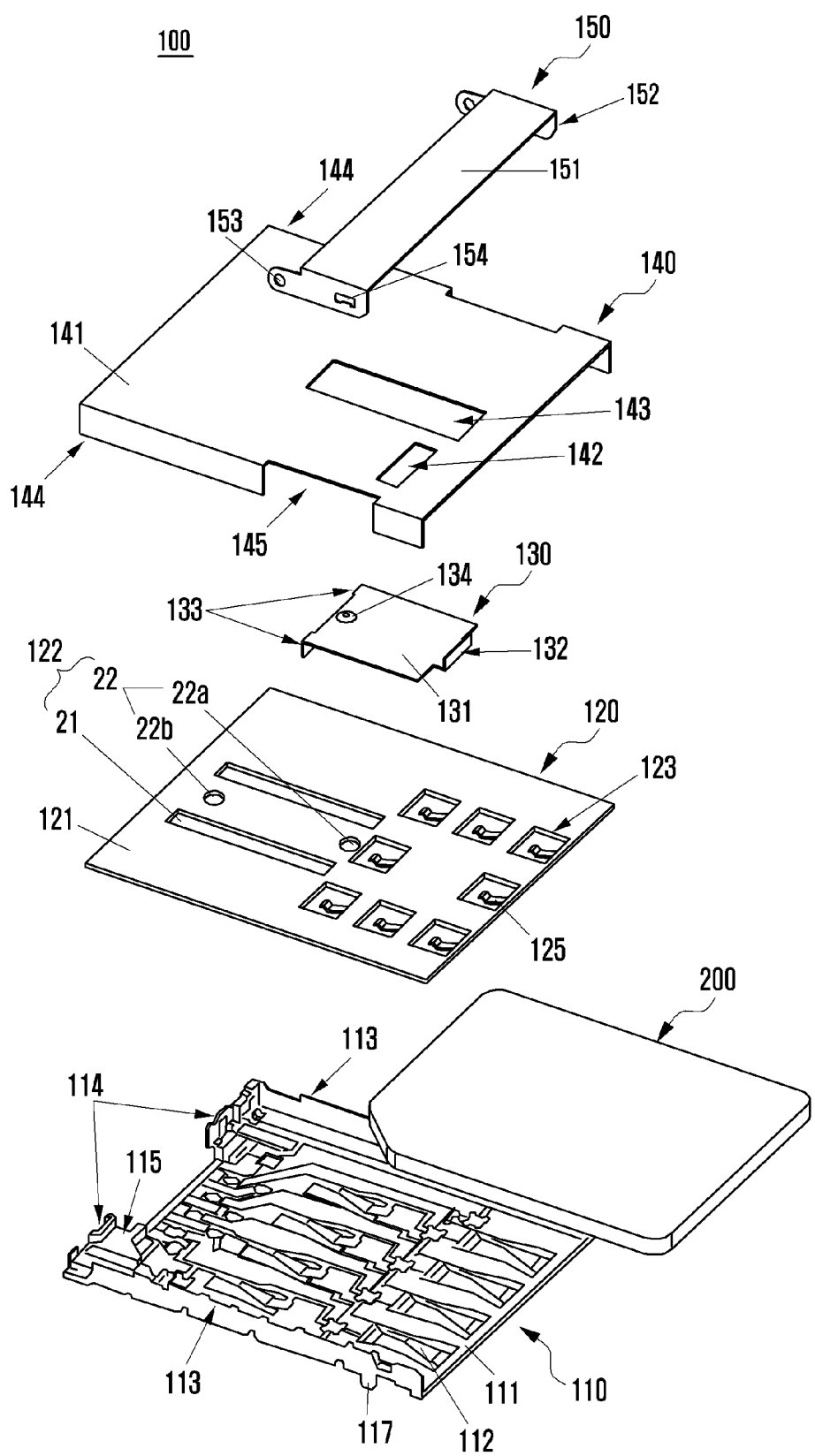
FIG. 4 is an exploded perspective view of the SIM card socket in accordance with the embodiment of the present disclosure.

FIG. 3 illustrates a configuration in which a second SIM card is to be inserted into the SIM card socket 100 in accordance with the embodiment of the present disclosure. FIG. 4 is an exploded perspective view of the SIM card socket 100 in accordance with the embodiment of the present disclosure.

Referring to FIGS. 2 to 4, the SIM card socket 100, in accordance with the embodiment of the present disclosure, includes a first contact part 110 disposed at the bottom of a space provided at one side of the positioning part 12, a second contact part 120 disposed to be spaced apart from the first contact part 110 by a predetermined separation, a first stopper 130 engaged with an upper surface of the second contact part 120, a cover 140 covering an upper side of the first stopper 130 and an upper side of the second contact part 120, and a second stopper 150 disposed on the cover 140.

The first contact part 110 includes first contact terminals 112 that may electrically contact the first SIM card 200 when the first SIM card 200 is inserted. The number of the first contact terminals 112 may correspond to the number of contacts provided in the first SIM card 200. For example, eight first contact terminals 112 may be provided. The first contact terminals 112 may protrude to firmly make contact with the contacts of the first SIM card 200 when the first SIM card 200 is inserted. In particular, the first contact terminals 112 may protrude from a bottom surface 111 of the first contact part 110 in the form of a plate spring, and may be bent so as not to interfere with insertion and detachment of the first SIM card 200.

The first contact part 110 includes a bottom surface 111 on which the first contact terminals 112 making contact with the contacts provided on a surface of the first SIM card 200 are provided, and side walls 113 perpendicularly extending from the bottom surface 111 by a predetermined height at opposite peripheries of the bottom surface 111. Supports 114 for supporting the second contact part 120 may be provided at inner peripheries of the bottom surface 111. The supports 114 may extend upwards together with the side walls 113, and may be perpendicularly formed on the bottom surface 111. Meanwhile, upper edges of the side walls 113 and upper edges of the supports 114 support a periphery of the second contact part 120, and in particular, an end 115 is provided at one side of an upper end of the support 114 to support one side periphery of the second contact part 120. Coupling holes and engaging projections may be further provided at the side walls 113 to support coupling and temporary engagement of the second stopper 150.

The second contact part 120 includes a plate member 121 having a predetermined thickness, second contact terminals 125 disposed at an outer end of the second contact part 120 to make contact with the contacts provided in the second SIM card 300 when the second SIM card 300 is inserted, terminal holes 123 in which the second contact terminals 125 are formed, and a stopper engaging part 122 with which the second stopper 150 is engaged.

The terminal holes 123 and the second contact terminals 125 formed in the terminal holes 123 are disposed at an outer side of a height of the plate member 121, and the stopper engaging part 122 is disposed at an inner side of the height of the plate member 121. The plate member 121 having the terminal holes 123 may be formed of a non-conductive material. The second contact terminals 125 may be formed of a conductive material. The number of the second contact terminals 125 may be the same as the number of the contacts provided in the second SIM card 300. The second contact terminals 125 may make electrical contact with the first contact terminals 112. Thereto, circuit wires that may electrically connect the second contact terminals 125 to the first contact terminals 112 of the first contact part 110 may be formed on at least one of an upper surface, a lower surface, and side surfaces of the plate member 121. The second contact terminals 125 may protrude from the plate member 121 by a predetermined height toward the first contact part 110 to firmly make electrical contact with the second SIM card 300 inserted between the first contact part 110 and the second contact part 120.

The stopper engaging part 122 includes parallel rails 21 spaced apart from each other by a predetermined distance, and locking holes 22 provided at opposite ends of the rails 21 along a central axis between the rails 21. The widths of the rails 21 may be the same as the widths of protrusions 133 formed in the first stopper 130 or may be somewhat larger than the widths of the protrusions 133 so that the protrusions 133 may be moved in a predetermined direction. The distance between the rails 21 also corresponds to a distance of the protrusions 133 formed in the first stopper 130. The locking holes 22 are holes engaged with a locking portion 134 formed in the first stopper 130. The locking holes 22 include a first hole 22a disposed adjacent to an area in which the second contact terminals 125 are formed, and a second hole 22b spaced apart from the first hole 22a by a predetermined distance and disposed between the rails 21 at an inner end of the second contact part 120. Here, the locking portion 134 is engaged with or separated from the first hole 22a and the second hole 22b as the first stopper 130 is moved. A location of the first hole 22a is provided to limit an insertion depth of the second SIM card 300, and a location of the second hole 22b is provided to limit an insertion depth of the first SIM card 200.

The first stopper 130 includes a first stopper plate member 131 having a width corresponding to the width between the opposing outer edges of the rails 21 provided in the stopper engaging part 122, a latch 132 formed at an outer end of the first stopper plate member 131, protrusions 133 formed at an inner end of the first stopper plate member 131, and a locking portion 134 formed at an inner end of the first stopper plate member 131.

Here, the latch 132 includes a first extending portion extending from a periphery of an outer end of the first stopper plate member 131 in a direction parallel to an upper surface of the first stopper plate member 131 and having a predetermined width, and a second extending portion extending perpendicular to the first extending portion and having a predetermined width. The latch 132 protrudes by a predetermined height through a latch hole 143 formed in the cover 140.

The protrusions 133 extend vertically downwards from opposite peripheries of an inner end of the first stopper plate member 131 to have a predetermined depth from a lower surface of the stopper plate member 131. Accordingly, the protrusions 133 are disposed to be symmetrical with respect to a center line of the first stopper plate member 131. The distance between the protrusions 133 may correspond to the distance between the rails 21. The protrusions 133 may protrude by a predetermined height in a space defined by the first contact part 110 and the second contact part 120 such that the first SIM card 200 or the second SIM card 300 inserted into a space between the first contact part 110 and the second contact part 120 may be inserted or removed. For example, the protrusions 133 preferably may have a height by which the protrusions 133 are not disturbed by the first contact terminals 112 formed in the first contact part 110 in a process of moving the first stopper 130. The protrusions 133 are inserted into the rails 21 and are moved in a direction parallel to the rails 21 on a lower surface of the second contact part 120 while being guided by the rails 21.

The locking portion 134 may protrude downwards from a lower surface of the first stopper plate member 131 by a predetermined height. The locking portion 134 has a dome shape and may be inserted into and separated from the locking holes 22 as the first stopper 130 is moved.

After the second contact part 120 is disposed at an upper side of the first contact part 110 and the first stopper 130 is engaged with the stopper engaging part 122 of the second contact part 120, the cover 140 is disposed to cover the second contact part 120 and the first stopper 130. In particular, the cover 140 includes a cover plate member 141 and cover side walls 144 to cover the first contact part 110, the second contact part 120, and the first stopper 130 while enclosing the side walls 113 of the first contact part 110. Guidance characters in the form of numbers or letters may be printed on an upper surface of the cover 140 so that the first SIM card 200 or the second SIM card 300 may be inserted after being identified. In particular, the guidance characters may be disposed to indicate an inner side and an outer side of the latch hole 143, and enables a location of the latch 132 of the first stopper 130 protruding from the latch hole 143 according to a type of the inserted SIM card to be visually identified.

The cover plate member 141 has a shape similar to that of an upper surface of the first contact part 110, and a latch hole 143 and an extraction hole 142 pass through upper and lower surfaces of the cover plate member 141. The latch hole 143 may be provided such that the latch 132 formed in the first stopper 130 movably protrudes through the latch hole 143. Accordingly, the width of the latch hole 143 is the same as or larger than the width of the latch 132 of the first stopper 130, and the length of the latch hole 143 is the same as that of the rails 21. The extraction hole 142 is formed in an area adjacent to an upper end of the latch hole 143 and has a predetermined width and a predetermined length. The extraction hole 142 is provided at a location at which at least a portion of the extraction hole 142 is not hidden even after the second stopper 150 is engaged with the cover 140, and is provided at a location at which the second stopper 150 may be easily separated from the cover 140. For example, a portion of the extraction hole 142 may be exposed after the second stopper 150 is engaged with the cover 140 so that the second stopper 150 is separated from the cover 140 by using a fingernail or a tool.

Cover side walls 144 having a predetermined height are provided perpendicular to a lower surface of the cover plate member 141, toward the rear surface of the cover plate member 141, on the lower surface of the cover plate member 141, and at opposite lengthwise peripheries of the cover plate member 141. The height of the cover side walls 144 may have a height by which the side walls 113 provided in the first contact part 110 are enclosed. For example, the cover side walls 144 may have the same height as that of the side walls 113. Meanwhile, exposure areas 145 may be provided at sides of the cover side walls 144 such that one side of the first contact part 110 is exposed to couple the second stopper 150 to the first contact part 110. The exposure areas 145 may be provided at corresponding locations of the opposite cover side walls 144.

The second stopper 150 is engaged with the cover 140 to perform a hinge operation around a hinge axis perpendicular to the side walls 144 of the cover 140 as the second stopper 150 is pressed and to limit movement of the first stopper 130. Accordingly, the first stopper 130 may be disposed below a location at which the second stopper 150 is disposed on the cover 140 when the first SIM card 200 is inserted, and may be disposed at a location at which the first stopper 130 is overlapped by the second stopper 150 on the cover 140 when the second SIM card 300 is inserted.

The second stopper 150 includes engaging portions 152 engaged with one side of the first contact part 110 through the exposure areas 145 provided in the cover 140, and a second stopper plate member 151 connecting the engaging portions 152. The second stopper plate member 151 has a length corresponding to a transverse width of the cover 140 and has a predetermined width, for example, a width smaller than the length of the latch hole 143. The engaging portions 152 vertically formed on a lower surface of the second stopper plate member 151 at opposite peripheries of the second stopper plate member 151 are formed perpendicular to the second stopper plate member 151, and each of the engaging portions 152 has a first engaging hole 153 provided close to a periphery of a side wall having a length larger than the width of the second stopper plate member 151 and engaged with the corresponding coupling hole formed in the first contact part 110, and a second engaging hole 154 temporarily engaged with an engaging projection. In particular, the first engaging holes 153 are coupled to the coupling holes provided in the first contact part 110 through a separate coupling structure and the coupling structure is inserted such that the second stopper 150 may be rotated in a hinged manner about the hinge axis formed through the first engaging holes 153. The second engaging holes 154 are temporarily engaged with the engaging projections formed in the side walls 113 of the first contact part 110, and are separated from the engaging projections when the stopper 150 is pressed in a hinging direction. The second engaging holes 154 serve to lock the stopper 150 in place.

Referring to FIG. 3, the first SIM card 200, in accordance with the embodiment of the present disclosure, is a plate member that has a predetermined thickness to be positioned in a space defined by the first contact part 110 and the second contact part 120. The first SIM card 200 provides a memory area in which user information may be recorded, and circuit wires for accessing the user information stored in the memory area and recording the information of the memory area.

Referring to FIG. 4, contacts disposed to make contact with the first contact terminals 112 formed in the first contact part 110 are provided on one surface of the first SIM card 200. As illustrated, the first SIM card 200 is inserted in a lengthwise direction of the first contact part 110. In particular, as the first SIM card 200 is inserted to the supports 114 formed in the first contact part 110, the contacts of the first SIM card 200 contact the first contact terminals 112. When the first SIM card 200 is inserted, the first stopper 130 is moved to an inner end of the first contact part 110. The first SIM card 200 may be a micro SIM card and may have a size of 12*15*0.76 mm.

Referring to FIG. 4, the second SIM card 300, in accordance with the embodiment of the present disclosure, is a plate member that has a predetermined thickness to be positioned in a space defined by the second contact part 120 and the first contact part 110. The second SIM card 300, like the first SIM card 200, provides a memory area in which user information may be recorded, and circuit wires for accessing the user information stored in the memory area and recording the information of the memory area. Contacts disposed to make contact with the second contact terminals 125 formed in the second contact part 120 are provided on one surface of the second SIM card 300. As illustrated, the second SIM card 300 is inserted in a lengthwise direction of the second contact part 120. In particular, as the second SIM card 300 is inserted to a location supported by the protrusions 133 of the first stopper 130, the contacts of the second SIM card 300 make contact with the second contact terminals 125. When the second SIM card 300 is inserted, the first stopper 130 is disposed at an upper surface of the second SIM card 300 such that the protrusions 133 are supported by the first stopper 130 so that the second SIM card 300 cannot be inserted by more than a predetermined depth. The second SIM card 300 may be a nano SIM card and may have a size of 8.8*12.3*0.67 mm.

As described above, since the width of the first SIM card 200 and the length of the second SIM card 200 are similar, the SIM card socket 100 in accordance with the embodiment of the present disclosure has a structure in which the first SIM card 200 may be inserted in a lengthwise direction of the first contact part 110 and also has a structure in which the second SIM card 300 may make electrical contact with the second contact part 120 when it is inserted in a widthwise direction of the second contact part 120. Then, since the first contact part 110 and the second contact part 120 face each other, the SIM card socket 100 enables the first SIM card 200 and the second SIM card 300 to share the same space when they are inserted through different contact surfaces. Here, the first contact part 110 is disposed on a bottom surface of the SIM card socket 100, and the second contact part 120 is disposed on an upper inside surface of the SIM card socket 100.

Figure 5:
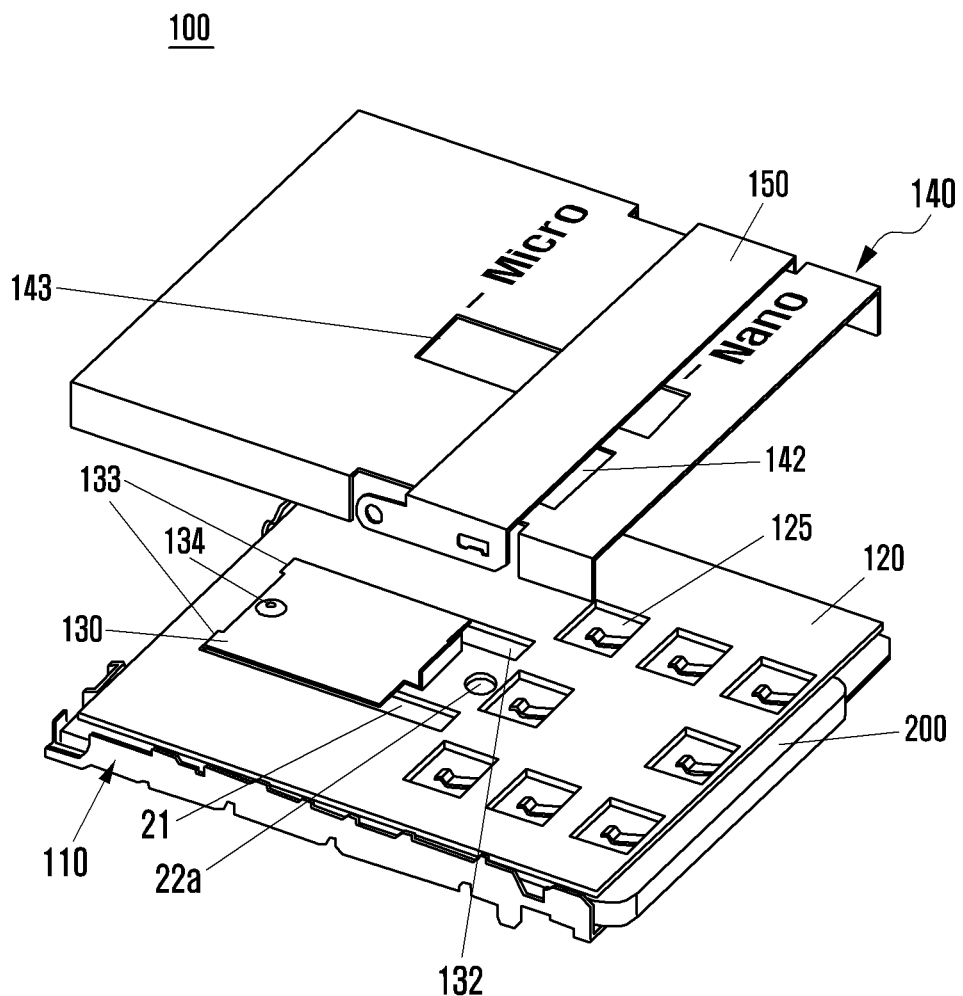
FIG. 5 is an exploded view illustrating a location of a first stopper in a state in which the first SIM card is inserted into the SIM card socket in accordance with the embodiment of the present disclosure.
Figure 6:
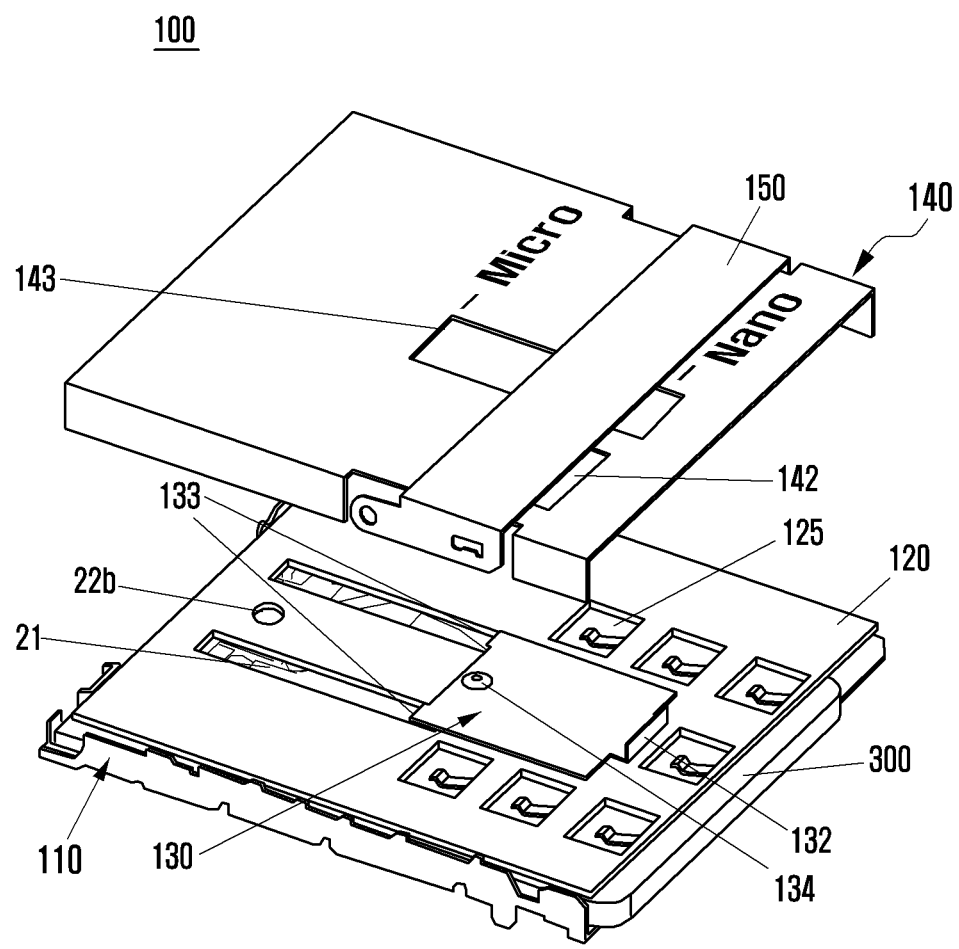
FIG. 6 is an exploded view illustrating a location of the first stopper in a state in which the second SIM card is inserted into the SIM card socket in accordance with the embodiment of the present disclosure.

FIG. 5 is an exploded view illustrating disposition of the first stopper when the first SIM card, in accordance with the embodiment of the present disclosure, is inserted. FIG. 6 is an exploded view illustrating disposition of the first stopper when the second SIM card, in accordance with the embodiment of the present disclosure, is inserted.

First, referring to FIG. 5, the first SIM card 200 having a size larger than that of the second SIM card 300 is inserted into an interior space of the SIM card socket 100 defined by the first contact part 110 and the second contact part 120. Here, the first contact provided in the first SIM card 200 is inserted in a direction facing the first contact terminals 112 (not shown) of the first contact part 110. The first SIM card 200 may be inserted to an area adjacent to a periphery of an inner end of the first contact part 110. Thereto, the first stopper is moved along the rails 21 and is disposed in an area adjacent to a periphery of an inner end of the second contact part 120. As the first stopper 130 is disposed in an area adjacent to a periphery of an inner end of the second contact part 120, the protrusions 133 provided in the first stopper 130 are disposed in an area in contact with inner ends of the rails 21 or adjacent to the inner ends of the rails 21. The locking portion 134 provided in the first stopper 130 may be engaged with the second hole 22b (not shown) of the locking holes 22 disposed in an area adjacent to inner ends of the rails 21.

The latch 132 of the first stopper 130 is disposed in an area in contact with an inner end of the latch hole 143 formed in the cover 140 or adjacent to the inner end of the latch hole 143. The protrusions 133 of the first stopper 130 support side walls of an inner end of the first SIM card 200 to enable the first SIM card 200 to properly make contact with the first contact terminals 112 provided in the first contact part 110. The second contact part 120 contacts a rear surface of the first SIM card 200 on which a separate electrical connection area is not provided. The second contact terminals 125 provided in the second contact part 120 may provide a resilient force on a rear surface of the first SIM card 200 like a plate spring if the second contact terminals protrude towards the first contact part 110. Accordingly, the second contact terminals 125 of the second contact part 120 support the first SIM card 200 so that the first SIM card 200 may more firmly make contact with the first contact terminals 112 of the first contact part 110.

Referring to FIG. 6, the second SIM card 300 is inserted into a space of the SIM card socket 100 provided by stacking the first contact part 110 and the second contact part 120 with a predetermined distance between them. Then, the second SIM card 300 may be a SIM card having a size smaller than that of the first SIM card 200. When the second SIM card 300 is inserted, the second contact formed in the second SIM card 300 is inserted to a surface that can contact the second terminals 125 provided in the second contact part 120. Meanwhile, as illustrated, both the width and length of the second SIM card 300 are smaller than a transverse length of a space formed in the SIM card socket 110. Meanwhile, as described above with reference to FIGS. 2 and 3, since the length of the second SIM card 300 is similar to the width of the first SIM card 200, the transversely disposed second SIM card 300 may be inserted into the SIM card socket 100 by a predetermined depth. Then, although the width of the second SIM card is smaller than the depth of an interior space of the SIM card socket 100, the second SIM card 300 may be inserted into the SIM card socket 100 only by a predetermined depth as it is supported by the protrusions 133 of the first stopper 130.

In more detail, the first stopper 130 is disposed at an outer end of the second contact part 120, that is, in an area in which the second contact terminals 125 are formed. In particular, the first stopper 130 is disposed close to outer ends of the rails 21, and the locking portion 134 of the first stopper 130 is engaged with the first hole 22a (not shown) of the locking holes 22 disposed in an area adjacent to the area in which the second contact terminals 125 are disposed. Accordingly, the latch 132 of the first stopper 130 is disposed at a predetermined location of an outer end of the second contact part 120, and the latch 132 may protrude through a periphery of an outer end of the latch hole 143 of the cover 140. When the second stopper 150 is engaged with the cover 140, the latch 132 of the first stopper 130 may be disposed to face a periphery of an outer end of the second stopper 150.

Meanwhile, as the first stopper 130 is located at an outer end of the second contact part 120, a portion of the first stopper 130 may be disposed to cover one of the second contact terminals 125 as illustrated. In this process, the first stopper 130 may contact one of the second contact terminals 125. Accordingly, the first stopper 130 may be formed of a non-conductive material and may interrupt electrical connection to the second contact terminals 125. The first stopper 130 may be formed of a conductive material and may be electrically connected to a contacting terminal of the second contact terminals 125 to serve as a ground of the contacting terminal.

Figure 7:
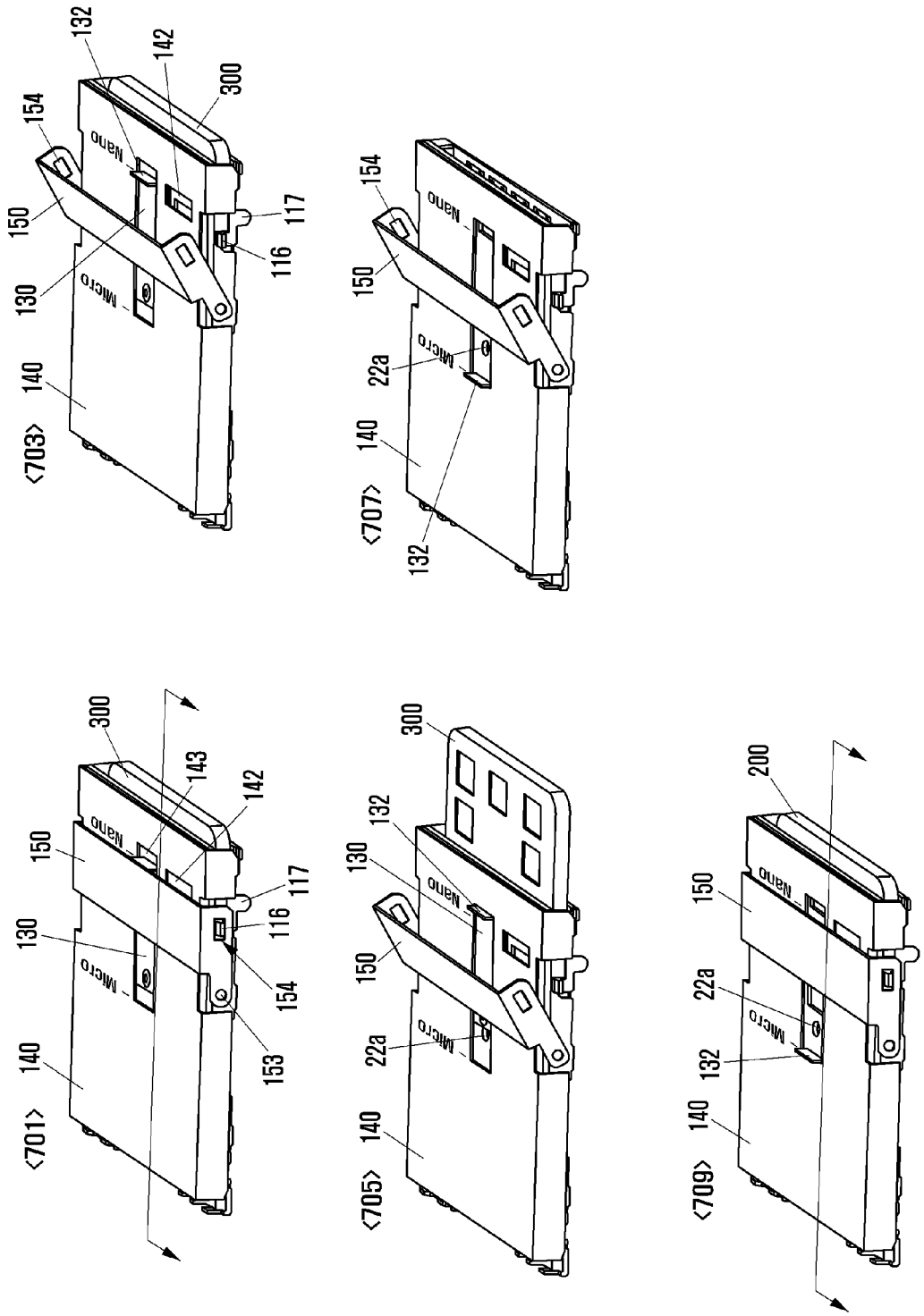
FIG. 7 illustrates views of a process of replacing a SIM card using the SIM card socket in accordance with the embodiment of the present disclosure; and, FIG. 8 shows sectional views of the SIM card socket in the SIM card replacing process of FIG. 7.
Figure 8:
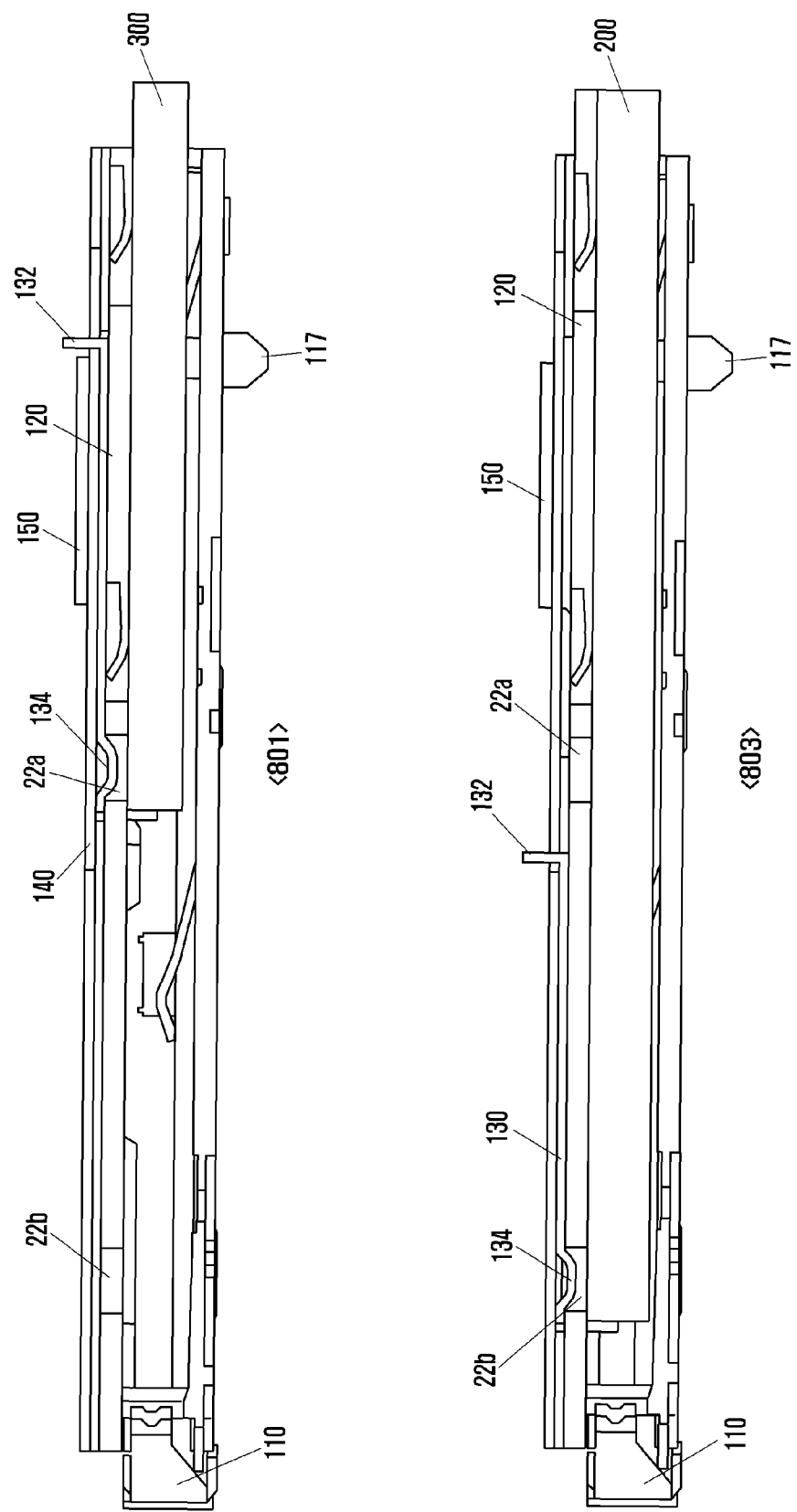

FIG. 7 illustrates replacement of the first SIM card and the second SIM card, in accordance with the embodiment of the present disclosure. FIG. 8 shows sectional views of sections of 701 and 709 of FIG. 7.

Referring to FIGS. 7 and 8, first, in 701, the second SIM card 300 is inserted into the SIM card socket 100. Then, as described above, the first stopper 130 is moved toward an outer end of the second contact part 120 (not shown) to limit an insertion depth of the second SIM card 300. Accordingly, the latch 132 (not shown) of the first stopper 130 protrudes through an outer end of the latch hole 143. As the second stopper 150 is engaged with the cover 140, a periphery of an outer end of the second stopper 150 faces the latch 132. The second stopper 150 has a first engaging hole 153 and a second engaging hole 154 at opposite sides thereof. The first engaging hole 153 is aligned with the coupling hole provided in a side wall of the first contact part 110 and is coupled in a rotating manner through a coupling structure. Meanwhile, the second engaging hole 154 may be temporarily engaged with an engaging projection 116 provided in a side wall of the first contact part 110 when the second stopper 150 is pressed.

In 703, in order to remove the second SIM card 300, the user may insert a fingernail or a tool into the extraction hole 142 provided in the cover 140 and press the second stopper 150 upward by using a lever principle based on the cover 140. Accordingly, the second stopper 150 may be operated by a hinge around a hinge axis formed by the coupling structure of the first engaging hole 153 when the second engaging hole 154 is separated from the engaging projection 116.

When the latch 132 of the first stopper 130 is exposed, the user presses the latch 132 toward an opening of the SIM card socket 100 as in 705. Accordingly, the protrusions 133 (not shown) supporting a side wall of an inner end of the second SIM card 300 serve to push the second SIM card 300 outwards when the first stopper 130 is moved toward the opening of the SIM card socket 100. As a result, when the latch 132 of the first stopper 130 is moved to a location at which the latch 132 contacts an outer end of the latch hole 143, the second SIM card 300 is pushed outwards from the SIM card socket 100 by the first stopper 130. Then, the locking portion 134 (not shown) of the first stopper 130 is temporarily separated from the first hole 22a of the locking holes 22.

Next, in order to insert the first SIM card 200, as in 707, the second SIM card 300 is separated and removed from the SIM card socket 100 and the first stopper 130 (not shown) is moved to inner ends of the rails 21 (not shown). Accordingly, the protrusions 133 (not shown) of the first stopper 130 may be located at inner ends of the rails 21, and the latch 132 of the first stopper 130 may be disposed in an area adjacent to an inner end of the latch hole 143. Then, since the second stopper 150 is spaced apart from the cover by a predetermined distance by a hinge operation as illustrated, the first stopper 130 may be moved toward an inner end of the SIM card socket 100 while a path of the first stopper 130 is not interrupted by the second stopper 150. The locking portion 134 (not shown) of the first stopper 130 may be temporarily engaged with the second hole 22b (See FIG. 8) of the locking holes 22 disposed in an area adjacent to inner ends of the rails 21.

In 709, the user may engage the second stopper 150 with the cover 140 again while inserting the first SIM card 200 into an opening area of the SIM card socket 100. Here, the cover 140 may be engaged irrespective of whether or not the first SIM card 200 is inserted. When the second stopper 150 is engaged with the cover 140, the second engaging hole 154 may be temporarily engaged with the engaging projection 116.

Although not illustrated, in order to remove the first SIM card 200 and insert the second SIM card 300, the first stopper 130 is moved towards an outer end of the latch hole 143 to extract and remove the first SIM card 200. Then, after the second stopper 150 is separated from the cover 140 through a hinge operation, the first stopper 130 is moved toward an outer end of the SIM card socket 100. Then, if the second SIM card 300 is inserted into the SIM card socket 100 after the second stopper 150 is engaged with the cover 140, the second SIM card 300 may be disposed as in 701 while being supported by the protrusions 133 of the first stopper 130.

The contacts provided in the second SIM card 300 should be inserted to face the second contact terminals 125 provided on a lower surface of the second contact part 120 in the process of inserting the second SIM card 300 in order that the SIM card may be normally inserted and electrically connected. Further, the contacts provided in the first SIM card 200 should be inserted to face the first contact terminals 122 provided on an upper surface of the first contact part 110 in the process of inserting the first SIM card 200 in order that the SIM card may be normally inserted and electrically connected. Printed guides for insertion directions may be provided on the first SIM card 200 and the second SIM card 300. For example, an expression such as "Insert with Contact Downwards" may be printed on the first SIM card 200 and an expression such as "Insert Contact Facing Upwards" may be printed on the second SIM card 300.

Although it has been described that the protrusions 133 provided in the first stopper 130 and the latch 132 vertically extend from an upper surface or a lower surface of the first stopper plate member 131, the present disclosure is not limited thereto. That is, the protrusions 133 and the latch 132 may extend at an inclination from the first stopper plate member 131 according to an intention of the manufacturer. However, as described above, the protrusions 133 should have an angle large enough to support the SIM cards such that the SIM cards may be extracted from the socket in the process of supporting side walls of inner ends of the SIM cards and extracting the SIM cards. Further, the latch 132 has an inclination large enough to press the SIM cards such that the SIM cards may be extracted in an operation of the user and may extend from the first stopper plate member 131. Although the shapes of the first contact part 110 and the second contact part 120 have been briefly described with reference to the accompanying drawings, the present disclosure is not limited thereto. That is, the first contact terminals 112 may be formed in the first contact part 110 at locations at which the first SIM card 200 is received and the first contact terminals 112 may contact the contacts provided in the first SIM card 200, and the first contact terminals 112 may provide some of the circuit wires that may be electrically connected to the control unit of the terminal device. Similarly, a portion of the second SIM card 300 also may be received in the second contact part 120, the second contact terminals 125 may be formed at locations that can make contact with the contacts provided in the second SIM card 300, and some of the circuit wires may be electrically connected to the first contact terminals 112. As a result, the main features of the present disclosure, are that the first SIM card 200 and the second SIM card 300 having different sizes may be normally and stably inserted into a space of the same SIM card socket 100 and the first stopper 130 may be moved in a lengthwise direction of the SIM card socket 100 for enabling easier extraction of the SIM cards during the extraction process. In particular, the second stopper 150 may be omitted according to an intention of the manufacturer, in which case the first SIM card 200 or the second SIM card 300 may be received by changing the locations of the latch hole 143 and the rails 21 as the user presses the first stopper 130.

The terminal device 10 provided with the aforementioned SIM socket 100 may further include various additional modules according to the form thereof. That is, when the terminal device 10 is a communication terminal based on the SIM card socket 100, it may further include a Near Field Communication (NFC) module for near field communication, an interface for transmission and reception of data through a wired communication method or a wireless communication method of the terminal device 10, an Internet communication module for communicating with the Internet network to perform an Internet function, and a digital broadcasting module for receiving and reproducing digital broadcasts. Although all possible constituent elements cannot be enumerated herein due to their sheer number, a large variety of constituent elements can be additionally included in the device, as can be easily understood by those skilled in the art to which the present disclosure pertains.

Further, the terminal device 100 in accordance with the embodiment of the present disclosure may include all information communication devices, multimedia devices, and application devices thereof, such as a Portable Multimedia Player (PMP), a digital broadcasting player, a Personal Digital Assistant (PDA), a music reproducer (for example, an MP3 player), a portable game terminal, a smart phone, a laptop computer, and a handheld PC, including all mobile communication terminals operated based on communication protocols corresponding to various communication systems.

As described above, the SIM card socket, in accordance with the embodiment of the present disclosure, can enable SIM cards having different sizes to be stably received into and easily extracted from the SIM card socket. In particular, the SIM card socket, in accordance with the embodiment of the present disclosure, enables SIM cards having different sizes to be removed from or inserted into the same space, maximizing space utility.

The present disclosure is not limited to the embodiments and the drawings, but it is apparent to those skilled in the art to which the present disclosure pertains that the present disclosure can be variously substituted, modified, and changed without departing from the scope of the present disclosure.

What is claimed is:

1. A SIM card socket comprising:
   a first contact part having first contact terminals electrically contacting a first SIM card when the first SIM card is received;
   a second contact part having second contact terminals electrically contacting a second SIM card when the second SIM card is received, wherein the second SIM card has a size different from that of the first SIM card;
   a first stopper disposed on the second contact part and being movable by a predetermined distance in a lengthwise direction of the second contact part along a surface of the second contact part to support insertion of the first SIM card or insertion of the second SIM card; and
   a cover covering the first contact part, the second contact part, and the first stopper,
   wherein the first contact part and the second contact part are disposed facing each other, and
   the second contact part comprises:
      a plate member having a predetermined thickness; and
      a stopper engaging part provided at one side of the plate member and engaged with the first stopper such that the first stopper is movable,
      wherein the second contact terminals are provided at one side of the plate member.

2. The SIM card socket of claim 1, wherein the stopper engaging part comprises:
   rails disposed parallel in a lengthwise direction of the plate member; and
   locking holes provided at locations spaced apart from each other by a predetermined distance between the rails.

3. The SIM card socket of claim 2, wherein the first stopper comprises:
   a first stopper plate member;
   protrusions protruding from a lower surface of the first stopper plate member and engaged with the rails;
   a latch protruding through a latch hole provided in the cover and movable along the latch hole when pushed; and
   a locking portion temporarily engaged with at least one of the locking holes.

4. The SIM card socket of claim 3, wherein the protrusions contact an inner wall of a bottom end of the first SIM card or a side wall of an inner end of the second SIM card to push the received first SIM card or second SIM card outwards from the SIM card socket.

5. The SIM card socket of claim 2, wherein the locking holes comprise:
 a first hole disposed adjacent to locations at which the second contact terminals are disposed and configured to fix the first stopper when the second SIM card is received; and
 a second hole disposed adjacent to bottom ends of the rails and configured to fix the first stopper when the first SIM card is received.

6. The SIM card socket of claim 1, further comprising a second stopper engaged with the cover and configured to perform a hinge operation around a hinge axis perpendicular to the cover as the second stopper is pressed and to limit movement of the first stopper.

7. The SIM card socket of claim 6, wherein the first stopper is located below a location at which the second stopper is disposed on the cover when the first SIM card is received, and is disposed at a location at which the first stopper is overlapped by the second stopper on the cover when the second SIM card is received.

8. The SIM card socket of claim 6, wherein the cover further comprises an extraction hole overlapping the second stopper when the second stopper is engaged with the extraction hole to support engagement of a side wall of the second stopper, and to support a hinge operation of the second stopper such that a portion of the second stopper is exposed.

9. The SIM card socket of claim 1, further comprising circuit wires for electrically connecting the first contact terminals and the second contact terminals.

10. The SIM card socket of claim 1, wherein the first SIM card is a micro SIM card, and the second SIM card is a nano SIM card.

11. The SIM card socket of claim 10, wherein a width of the first SIM card is similar to a length of the second SIM card.

12. A terminal device comprising:
 a positioning part in which a battery is positioned; and
 a SIM card socket disposed in a peripheral area of the positioning part,
 wherein the SIM card socket comprises:
 a first contact part having first contact terminals electrically contacting a first SIM card when the first SIM card is received;
 a second contact part having second contact terminals electrically contacting a second SIM card when the second SIM card is received, wherein the second SIM card has a size different from that of the first SIM card;
 a first stopper disposed on the second contact part and being movable by a predetermined distance in a lengthwise direction of the second contact part along a surface of the second contact part to support insertion of the first SIM card or insertion of the second SIM card; and
 a cover covering the first contact part, the second contact part, and the first stopper,
 wherein the first contact part and the second contact part are disposed facing each other, and
 the second contact part comprises a plate member having a predetermined thickness, and a stopper engaging part provided at one side of the plate member and engaged with the first stopper such that the first stopper is movable, wherein the second contact terminals are provided at one side of the plate member.

13. The terminal device of claim 12, further comprising circuit wires for electrically connecting the first contact terminals and the second contact terminals.

14. The terminal device of claim 12, wherein the first SIM card is a micro SIM card, and the second SIM card is a nano SIM card.

15. The terminal device of claim 12, wherein a width of the first SIM card is similar to a length of the second SIM card.

\* \* \* \* \*